United States Patent [19]

House et al.

[11] Patent Number: 5,071,575

[45] Date of Patent: * Dec. 10, 1991

[54] WELL WORKING COMPOSITIONS, METHOD OF DECREASING THE SEEPAGE LOSS FROM SUCH COMPOSITIONS, AND ADDITIVE THEREFOR

[75] Inventors: Roy F. House, Houston, Tex.; Andree H. Harrington; Jack C. Cowan, both of Lafayette, La.

[73] Assignee: Venture Innovations, Inc., Lafayette, La.

[*] Notice: The portion of the term of this patent subsequent to Apr. 2, 2008 has been disclaimed.

[21] Appl. No.: 624,631

[22] Filed: Dec. 10, 1990

Related U.S. Application Data

[63] Continuation-in-part of Ser. No. 421,751, Oct. 16, 1989, Pat. No. 5,004,553.

[51] Int. Cl.$^5$ ................................................ C09K 7/00
[52] U.S. Cl. ................................ 507/104; 252/8.551; 175/72; 507/910
[58] Field of Search ............... 252/8.51, 8.512, 8.514, 252/8.513, 8.515, 8.551; 175/72

[56] References Cited

U.S. PATENT DOCUMENTS

| | | | |
|---|---|---|---|
| 2,319,705 | 3/1941 | Post et al. | 252/8.511 |
| 2,650,195 | 8/1953 | Cardwell et al. | 252/8.51 |
| 2,749,308 | 6/1956 | Beckum | 252/8.51 |
| 2,778,604 | 1/1957 | Reistle, Jr. | 166/292 |
| 2,811,488 | 10/1957 | Nestle et al. | 252/8.512 |
| 2,943,680 | 7/1960 | Scott | 252/8.512 X |
| 3,441,528 | 4/1969 | Dede, Jr. | 252/8.51 |
| 3,629,102 | 12/1971 | Lummus | 252/8.51 |
| 3,965,986 | 6/1976 | Christopher | 166/292 |
| 4,083,407 | 4/1978 | Griffin, Jr. et al. | 166/291 |
| 4,217,965 | 8/1980 | Cremeans | 175/72 |
| 4,247,403 | 1/1981 | Foley et al. | 252/8.512 |
| 4,404,107 | 9/1983 | Cowan et al. | 252/8.514 |
| 4,428,843 | 1/1984 | Cowan et al. | 252/8.51 |
| 4,474,665 | 10/1984 | Green | 252/8.51 |
| 4,531,594 | 7/1985 | Cowan | 175/72 |
| 4,670,944 | 6/1987 | Thrash | 19/58 |
| 4,732,213 | 3/1988 | Bennet et al. | 166/292 |
| 5,004,553 | 4/1991 | House et al. | 252/8.51 |

Primary Examiner—Robert L. Stoll
Assistant Examiner—Chhaya Sayala
Attorney, Agent, or Firm—Roy F. House

[57] ABSTRACT

The invention provides well working fluid compositions containing oat hulls ground to certain particle size ranges to decrease the seepage loss of the fluid to fluid permeable formations contacted by the compositions. Also provided is a seepage loss additive comprising the ground oat hulls in combination with one or more of ground corn cobs, hydrophobic organophilic water wettable cotton, ground citrus pulp, and ground cotton burrs.

10 Claims, No Drawings

WELL WORKING COMPOSITIONS, METHOD OF DECREASING THE SEEPAGE LOSS FROM SUCH COMPOSITIONS, AND ADDITIVE THEREFOR

This application is a continuation-in-part of copending patent application Ser. No. 07/421,751, filed Oct. 16, 1989, now U.S. Pat. No. 5,004,553.

The invention relates to compositions for use in well-working operations such as drilling, workover and completion, packing and the like, well-working processes utilizing such compositions, and an additive to reduce the seepage loss of the compositions to the formation.

In the rotary drilling of wells for oil and gas, drilling fluids ("muds") are circulated in such a manner as to remove cuttings and to support the walls of the hole. The fluids may be either water base, comprising for example, clay, polymers, weight material and other additives dispersed in water, or oil base, comprising for example, suspending agents (generally organophilic clays), emulsifiers, stability agents, filtration control agents, weighting agents, and other additives dispersed in diesel oil and the like oleaginous mediums, all as are well known in the art.

A thin, low-permeability filter cake on the sides of the borehole is necessary to control the filtration characteristics of the drilling fluid since the pressure of the mud column in the borehole is greater than the formation pressure. A filter cake forms when the drilling fluid contains particles of a size only slightly smaller than the size of the pore openings of the formation. The liquid which enters the formation while the cake is being established, is known as the surge loss or spurt loss, while the liquid which enters after the cake is formed as the drilling fluid filtrate. The permeability of the filter cake is directly related to the particle size distribution in the drilling fluid, and, in general, the cake permeability decreases as the concentration of particles in the colloidal size range increases.

The filtration properties required for the successful completion of a well depend on the nature of the formations being drilled and on the type of drilling fluid used. Thus in water sensitive formations, oil base mud provides superior hole stabilization when the salinity of the aqueous phase of the mud is adjusted to prevent migration of water from the mud to the formation.

Both the spurt loss and filtration rate must be minimized when penetrating potentially productive formations in order to minimize any damaging effects from fluids entering the formation. These properties should also be minimized throughout the drilling process when using oil base muds because of the high cost of these muds.

When the drilling bit passes through the porous, fractured or vugular strata such as sand, gravel, shale, limestone and the like, the hydrostatic pressure caused by the vertical column of drilling fluid exceeds the ability of the surrounding earth formation to support this pressure. As a consequence drilling fluid is lost to the formation and fails to return to the surface. This loss may be any fraction up to 100% loss of the total circulating drilling fluid volume. This condition is known in the art as lost circulation. Even with the best drilling practices, circulation losses can and will occur. Loss zones can be classified as seepage loss (when the severity of the loss is 1 to 10 bbl/hr [0.16 to 1.6 $m^3/h$]), partial loss (when the severity of the loss is 10 to 500 bbl/hr [1.6 to 80 $m^3/h$]), and complete loss (when the severity of the loss is greater than 500 bbl/hr [80 $m^3/h$]).

In order to combat or prevent lost circulation, it has been common in the past to add any number of materials to the drilling fluid which act to reduce or prevent flow of the drilling fluid outwardly in a porous stratum thereby arresting a lost circulation condition. These materials are commonly referred to as lost circulation materials. Such prior known lost circulation materials include fibrous, flake, and granular materials. Representative of the organic natural products or modifications thereof that have been disclosed for use as lost circulation materials include nut and seed shells or hulls (pecan, almond, walnut, peach, brazil, coconut, peanut, sunflower, flax, cocoa bean, cottonseed, rice, linseed); crude pectate pulp; feathers; citrus pulp; beet pulp; peat moss fibers; jute; flax; mohair; lechuguilla fibers; cotton; cotton linters; wool; paper; wet-strength paper; sugar cane; bagasse; bamboo; corn stalks; sawdust; straw; wood fiber; cedar fiber; bark chips; cork; popped popcorn; dehydrated vegetable matter (suitably dehydrated carbohydrates such as citrus pulp, oatmeal, tapioca, rice grains, potatoes, carrots, beets, and various grain sorghams); the ground woody ring portion of corncobs; whole ground corn cobs; hydrophobic, organophilic, water-wettable fibrous materials such as treated cotton, dried bagasse, and dried peat fibers; and specific mixtures of these materials. Many assorted inorganic materials have been used as lost circulation additives.

Seepage losses can occur to any type of loss zone and in any type of formation when the particles in the mud are not fine enough to complete the seal. It has been established that the maximum allowable drilling fluid loss is on the order of 1 bbl/hr [0.16 $m^3/h$], as measured in the mud pit at the surface. Remedial measures should be taken when the mud loss exceeds 1 bbl/hr [0.16 $m^3/h$].

It is an object of the present invention to provide an additive which is very effective as a seepage loss control agent in both water base and oil base well working fluids.

It is another object of this invention to provide well working compositions having a low seepage loss.

Still another object of this invention is to provide a method of decreasing the seepage loss from water base and oil base well working fluids.

These and other objects of the invention will appear to one skilled in the art as the description thereof proceeds.

In accordance with one illustrative embodiment of the invention, we have found that ground oat hulls are effective in both oil base and water base fluids to decrease the seepage loss thereof. In accordance with another embodiment of the invention, we have found that mixtures of ground oat hulls and a particulate material selected from the group consisting of ground corn cobs, hydrophobic organophilic water wettable cotton, ground citrus pulp, ground cotton burrs, and mixtures thereof are also excellent additives to decrease the seepage loss from both oil base and water base fluids.

The oat hulls utilized as the seepage loss reducing additive of this invention is the husk that surrounds the oat seed. The oat plant has a stem that grows from 2 to 4 feet high. The stem ends in a head called a panicle, which consists of many small branches. Each branch ends in a single spikelet (flower cluster). Most spikelets contain two seeds, each enclosed by a husk called the hull. The hull must be removed before the seeds can be processed into oatmeal or other food products for human consumption.

The oat hulls are ground to prepare the seepage loss reducing additive of this invention. The particle size of the ground oat hulls is such that at least 95% of the particles are less than about 590 microns (No. 30 U.S. Standard Seive Series). Additionally, it is preferred at least about 75% of the particles are less than about 250 microns (No. 60 U.S. Standard Sieve Series) and at least about 10% of the particles are less than 74 microns (No. 200 U.S. Standard Sieve Series).

It is another aspect of this invention to prepare a seepage loss reducing additive by mixing ground oat hulls with a ground particulate material selected from the group consisting of ground corn cobs, ground citrus pulp, ground cotton burrs, the hydrophobic organophilic water wettable cotton of Cowan et al. U.S. Pat. No. 4,404,107, and mixtures thereof. The ground particulate material may be first ground and then admixed with the ground oat hulls, or the oat hulls, either unground or ground, can be admixed with the particulate material and the admixture then ground to provide a seepage loss reducing additive of this invention. It is preferred that the seepage loss reducing additive have a particle size such that at least 95% of the particles are less than about 590 microns. Additionally, it is preferred that at least about 75% of the particles are less than about 250 microns and at least about 10% of the particles are less than about 74 microns.

The particulate material can be ground to a particle size distribution such that on admixing with the ground oat hulls, the seepage loss reducing additive has the desired particle size distribution, or the mixture can be ground together to give the desired particle size distribution.

The ground corn cobs which may be admixed with the ground oat hulls may comprise the whole dried corn cob which has been ground or it may be any portion of the corn cob, such as the woody ring portion of the corn cob. See, for example, Foley et al. U.S. Pat. No. 4,247,403, incorporated herein by reference.

The ground citrus pulp which may be admixed with the ground oat hulls comprises the skin, the cells adhered to the interior of the skin, the seeds, and the stems of citrus fruit such as oranges, grapefruits, and lemons. For purposes of the present invention, citrus pulp can be considered to be whatever material is left over after the useable juices, sugars, and liquors have been extracted from citrus fruit. The citrus pulp is dried and then ground, such as in a conventional hammer mill. Alternatively, the citrus pulp can be mixed with the oat hulls and the mixture ground such that the mixture has the desired particle size distribution.

The hydrophobic organophilic water wettable cotton which can be admixed with the ground oat hulls is disclosed in Cowan et al. U.S. Pat. No. 4,404,107, incorporated herein by reference. Thus, the preferred hydrophobic organophilic water wettable cotton is prepared by reacting dry hydrochloric acid gas with raw cotton, preferably a short fiber cotton, for a period of time and at a temperature sufficient to provide the cotton with the characteristics of hydrophobicity, organophilicity, and water wettability.

Is is another aspect of this invention to admix ground cotton burrs with the ground oat hulls to provide superior seepage loss reducing additives for well working fluids, particularly drilling fluids. Mechanically harvested cotton normally contains more foreign matter than cotton harvested by hand, necessitating more elaborate cleaning equipment at the cotton gin. When cotton arrives at the gin, it is sucked into the building through pipes that are placed in the trailers or trucks that transport the cotton. Usually it first enters driers that reduce the moisture content of the cotton for easier processing. Next the cotton travels to equipment that removes burrs, sticks, dirt, leaf trash, and other foreign matter from the cotton and cotton seeds. The term "cotton burrs" in this specification is intended to mean the composited material removed in the cotton ginning process from the cotton and cotton seeds. This material, which may be called "gin trash" is primarily the cotton burr which forms the outer, hard portion of the cotton ball.

The seepage loss reducing additive of this invention may contain from about 1% to about 100% by weight of the ground oat hulls and from about 99% to 0% by weight of the ground particulate materials selected from the group consisting of ground corn cobs, ground citrus pulp, ground cotton burrs, the hydrophobic organophilic water wettable cotton of Cowan et al. U.S. Pat. No. 4,404,107, or mixtures thereof. Other finely ground materials can be admixed with the ground oat hulls to produce seepage loss reducing additives having the particle size distribution set forth herein.

Different methods have been developed in response to the variability of needs for particle size measurement. The most widely employed sizing method determines particle size by the degree to which a powder is retained on a series of sieves with different opening dimensions. This technique is straightforward and requires simple equipment, but without attention to detail it can lead to erroneous results. The sieves, particularly those with the finer meshes, are damaged by careless handling. They tend to become clogged with irregularly shaped particles unless agitated, but distorted if agitated too much. Furthermore, it is always a concern to determine when all particles that might pass through a sieve have done so.

A typical sieve is a shallow pan with a wire mesh bottom or an electroformed grid. Opening dimensions in any mesh or grid are generally uniform within a few percent. Sieves are available with openings from 5 microns in several series of size progression. Woven wire-mesh sieves have approximately square openings whereas electroformed sieves have round, square, or rectangular openings. Wire sieves tend to be sturdier and less expensive, and have a greater proportion of open area. They are much more frequently employed than are electroformed sieves except in the very fine particle range where only electroformed sieves are available.

Dry-sieving is typically performed with a stack of sieves with openings diminishing in size from the top downward. The lowest pan has a solid bottom to retain the final undersize. Powders are segregated according to size by placing the powder on the uppermost sieve and then shaking the stack manually, with a mechanical vibrator, or with air pulses of sonic frequency until all particles fall onto sieves through which they are unable to pass or into the bottom pan. In another device, sieves are employed one at a time within a container from which passing particles are captured by a filter. Agitation on the sieve is provided by a rotating air jet. The material retained by the sieve is recovered and recycled with the next coarser sieve until all of the powder is exposed to the desired series of sieves or all material passes.

Wet-sieving is performed with a stack of sieves in a similar manner except that water or another liquid that does not dissolve the material, is continually applied to facilitate particle passage. A detergent is frequently added to promote particle dispersion. This enhanced dispersion is almost essential for fine-particle analysis, because under dry conditions, electrostatic and surface forces greatly impede clean passage and isolation of sizes. A partial vacuum is sometimes applied to fine-particle sieving. Ultrasonic energy dislodges irregular particles trapped in sieve openings provided it is used at moderate density; a maximum of 0.45 W/cm$^2$ at a frequency of 40 kHz has been recommended.

The particle mass retained by each sieve is determined by weighing, after drying when necessary, and each fraction is designated by the sieve size it passed and the size on which it was retained.

The particle size, for the purposes of this invention, is determined after the seepage loss reducing additive is admixed with 3% by weight of a fine, particulate silica flow control agent, preferably fumed silica. We have determined that dry sieving of the ground oat hulls, and other materials having an elongated particle shape, i.e., acicular or fibrous particles, without the silica causes the finer particles to agglomerate resulting in an indicated particle size distribution which is larger than the actual dry particle size.

The fumed silica is a well known commercially available product obtained by the vapor phase hydrolysis of silicon tetrachloride at ultra high temperatures.

A high boiling point liquid hydrocarbon of the type used in well working fluids, such as diesel oil, low toxicity mineral oil, etc., can be added to aqueous base well working fluids containing the seepage loss reducing additive of this invention or to which the seepage loss reducing additive is to be added. The seepage loss reducing additive sorbs the hydrocarbon and concentrates it on the sides of the well thus generally further decreasing the seepage loss from the well working fluid. Alternatively, a liquid hydrocarbon can be sorbed onto the seepage loss reducing additive of this invention to provide a particulate additive having enhanced seepage loss reducing characteristics and lubricating characteristics. In well working fluids which contact potential oil and gas producing formations, a suitable organic liquid can be substituted for the liquid hydrocarbon such that the organic liquid will not interfere with the hydrocarbon analysis of the formations.

Preferably the hydrocarbon/organic liquid is present in the well working fluid or in admixture with the seepage loss reducing additive in an amount to provide a weight ratio of the hydrocarbon/organic liquid to the seepage loss reducing agent from about 0.1/1 to about 2/1, most preferably from about 0.15/1 to about 1/1. The hydrocarbon/organic liquid may be present in the drilling fluid in concentrations in excess of the amount which can be sorbed by the seepage loss reducing additive of this invention.

The seepage loss reducing additive of this invention can be used as a carrying agent for gilsonite or other asphaltene-type material to stabilize troublesome shale sections in a well. Since gilsonite is not water soluble or dispersible, a wetting agent should be admixed with the gilsonite/seepage loss additive composite material to ensure adequate dispersion of the gilsonite in the aqueous base drilling fluid. Preferred wetting agents are non-ionic surfactants such as polyethoxylated alcohols, alkyl phenols, and the like organic materials which contain at least one hydroxyl group and a large hydrocarbon radical within their molecular structure.

Gilsonite and asphaltic-type materials have been used to stabilize sloughing shales to reduce borehole erosion. It is theorized that the gilsonite penetrates the shale pore spaces, microfractures, and bedding planes of the shale as the drill bit penetrates the formation. Presumably the gilsonite extrudes into the pores, fractures, and bedding planes to reduce or minimize filtrate and whole mud invasion and thus bond the matrix to prevent sloughing. The seepage loss reducing additive of this invention then functions to bridge across the surface of the shale reducing the seepage of the drilling fluid into the formation. The fluid loss control agent in the drilling fluid enables the drilling fluid to form an impermeable filter cake on the sides of the borehole thus minimizing the loss of fluid to the formations contacted by the drilling fluid.

A crosslinkable polymer can be admixed with any one or any combination of ground oat hulls, ground corn cobs, ground citrus pulp, ground cotton burrs, ground paper, hydrophobic organophilic water wettable fibrous materials (see U.S. Pat. No. 4,428,843, incorporated herein be reference), and beet pulp to form a plugging agent for boreholes experiencing gross lost circulation of whole mud to the formation, i.e., circulation losses greater than about 10 bbl/hr. The polymer blend will be added to either an aqueous liquid or an oleaginous liquid, depending on the properties of the polymer, at a concentration of about 10 ppb to about 75 ppb. Thereafter a crosslinking additive will be added, and the plugging liquid pumped as a "pill" or "slug" to the zone of lost circulation in the well. The type of crosslinking additive and its concentration is chosen such that the plugging liquid forms a rubbery, semi-solid mass by the time that it reaches the lost circulation zone.

Suitable water soluble or water dispersible polymers for use in aqueous liquids are polymers containing hydroxyl groups located on adjacent carbon atoms in the cis configuration, as is well known in the art. Suitable polysaccharides are disclosed in Walker U.S. Pat. No. 3,215,634, incorporated herein by reference. Dihydroxypropyl-modified polysaccharides as disclosed in Sandy et al. U.S. Pat. No. 4,649,999, incorporated herein by reference, as is polyvinylalcohol (see Savins U.S. Pat. No. 3,299,952, incorporated herein by reference). Suitable crosslinking additives for these polymers are borate-yielding compounds such as those disclosed in the aforesaid patents and Mondshine U.S. Pat. No. 4,619,776, incorporated herein by reference. Other crosslinkable polymers and crosslinking additives therefor are given in the following U.S. Patents, incorporated herein by reference: Hodge—U.S. Pat. No. 4,657,081; Kucera—U.S. Pat. No. 4,692,254; Sydansk et al.—U.S. Pat. No. 4,722,397; Hanlon et al.—U.S. Pat. No. 4,767,550.

The well working compositions of our invention can be prepared by adding the seepage loss reducing additive to the water base or oil base well working fluid. A water base well working composition will generally contain a suspending agent such as clay or polymer, weight material which may be insoluble, such as barite, siderite, galena, ilmenite, hematite, and the like, or which may be a soluble salt such as sodium chloride, potassium chloride, calcium chloride, calcium bromide, zinc bromide and the like, fluid loss additives such as starch, CMC, carboxymethyl starch, polyacrylates and other polymers, and other additives such as viscosity control agents, oil, lubricants, emulsifiers, lost circulation materials and other functional additives. Oil base well working fluids will generally contain additives which provide these same functions, with the exception of the lubricants. Representative suspending agents are the organophilic clays. Representative weight materials are the insoluble materials enumerated above. Representative fluid loss control additives are asphaltic materials, organophilic humates, organophilic lignosulfonates, polymers and the like. Representative emulsifiers are calcium soaps, such as calcium tallate, fatty amides, partial fatty amides of polyamines, and the like.

The amount of the seepage loss reducing additive of this invention added to the well working fluid needs only to be an amount which is effective in reducing the seepage loss to the desired extent. Generally, the more additive added, the greater the seepage loss reduction. Preferably, there is added from about 1 ppb to about 50 ppb of the seepage loss reducing additive, most preferably from about 3 ppb to about 20 ppb.

Another embodiment of our invention is a process to decrease the seepage loss or spurt loss of a well working fluid, particularly drilling fluids, which comprises adding to the well working fluid a quantity of the seepage loss reducing additive of this invention sufficient to effect such decrease. Generally, there will be required from about 1 pound per 42 gallon barrel (ppb) to about 50 ppb, preferably from about 3 ppb to about 20 ppb.

The seepage loss reducing additive of this invention may be added to the well working fluids, either aqueous-base or oil base, utilizing the slugging technique disclosed in Cowan et al. U.S. Pat. No. 4,531,594, incorporated herein by reference. Thus a concentrated "pill" of about 20–50 bbl total volume can be made by mixing from about 15 ppb to about 50 ppb of the seepage loss reducing additive in the well-working fluid. The pill will preferably contain from about 15 ppb to about 40 ppb of the seepage loss reducing additive. The pill may be formulated to also contain a fluid loss reducing additive as disclosed in U.S. Pat. No. 4,531,594. Typical fluid loss reducing additives and typical methods of employing the pill are set forth in U.S. Pat. No. 4,531,594. For aqueous base drilling fluids, well known fluid loss additives may be added to the pill.

The seepage loss reducing additive of this invention can be mixed with materials having a larger particle size distribution and the mixture used to combat larger losses of the fluid to the formations being drilled. Alternatively, the seepage loss reducing additive can be added separately to a drilling fluid to which a material having a larger particle size distribution is also added.

In order to more completely describe the invention, the following non-limiting examples are given. In these examples and throughout this specification, the following abbreviations may be used: ppb=lb per 42 gallon barrel; ppg=lb per gallon; sec=seconds; min=minutes; G.S.=gel strength; vol=volume; API=American Petroleum Institute; °F.=degrees farenheit; O.H.=oat hulls; C.C.=corn cobs; H.R.=hot roll; cp=centipoise; sq.ft.=square feet; cc=cubic centimeters; CFL=complete fluid loss; AV=apparent viscosity, cp; YP=yield point, lb/100 sq.ft. All mesh sizes used in the description of the invention are in terms of U.S. Standard Sieve Series, Fine Series of 1940. A particle size designated +X indicates the particles were retained on a sieve of size X mesh. A particle indicated Y/Z indicates that the particles passed through a sieve of mesh size Y and were retained on a sieve of mesh size Z. A particle size designated −W indicates that the particles all passed through a seive of mesh size W.

The particle size distribution of the various samples evaluated in the Examples is set forth in Table I. All percentages throughout the Tables, Examples, and this specification are weight percent unless otherwise indicated.

The particle size of the various samples was determined using the following procedure: A series of sieves of varying mesh sizes (U.S. Standard Sieve Series) with openings diminishing in size from the top downward were stacked over a solid bottom pan. The samples were admixed with 3% by weight fumed silica (CAB-O-SIL M5), placed on the top sieve, covered, placed on a RO-TAP sieve shaker, and shaken for 10 minutes. The weight of sample retained on each sieve was determined and the % by weight of sample on each sieve calculated.

TABLE I

| SAMPLE | Particle Size Distribution of Sample, % | | | | | |
|---|---|---|---|---|---|---|
| | +14 | 14/30 | 30/60 | 60/100 | 100/200 | −200 |
| Oat Hulls No. 1 | 0 | 0.4 | 17.6 | 40.6 | 27.2 | 14.2 |
| Oat Hulls No. 2 | 0 | 0 | 100 | 0 | 0 | 0 |
| Oat Hulls No. 3 | 0 | 0 | 0 | 100 | 0 | 0 |
| Oat Hulls No. 4 | 0 | 0 | 0 | 0 | 100 | 0 |
| Oat Hulls No. 5 | 0 | 0 | 0 | 0 | 0 | 100 |
| Ground Corn Cobs No. 1 | 0 | 0 | 48.6 | 20.7 | 15.8 | 14.9 |
| Ground Corn Cobs No. 2 | 0 | 0 | 100 | 0 | 0 | 0 |
| Ground Corn Cobs No. 3 | 0 | 0 | 0 | 100 | 0 | 0 |
| Ground Corn Cobs No. 4 | 0 | 0 | 0 | 0 | 100 | 0 |
| Ground Corn Cobs No. 5 | 0 | 0 | 0 | 0 | 0 | 100 |
| Ground Corn Cobs No. 6 | 0 | 1.3 | 25.0 | 16.5 | 18.5 | 38.7 |
| Ground Corn Cobs No. 7 | 0 | 0 | 23.2 | 30.8 | 27.7 | 18.3 |
| Ground Corn Cobs No. 8 | 0 | 0 | 0.8 | 0.2 | 21.0 | 78.0 |
| Ground Cotton Burrs | 0 | 0.2 | 1.7 | 38.7 | 40.3 | 19.1 |
| HOWWC | 0 | 2.5 | 4.9 | 12.2 | 21.2 | 59.2 |

EXAMPLE 1

10 ppb of a seepage loss reducing additive comprising 90% Oat Hulls No. 1 and 10% Ground Corn Cobs No. 1 were mixed into a 12 ppg oil base drilling fluid. This mud had a mineral oil/30% calcium chloride solution ratio of 80/20, and contained 10 ppb VEN-MUL 906 emulsifier, 5 ppb VEN-MUL 907 oil wetting agent, 2 ppb lime, 6 ppb organoclay suspension agent, and was weighted with barite. Thereafter the initial API RP 13B rheology were taken; the sample together with a sample of the untreated oil base mud were hot rolled in an oven for 72 hours at 150 F.; the samples cooled and mixed 10 minutes; and the API RP 13B rheology obtained. The ability of the muds to seal off a porous sand was evaluated in the following manner: 200 grams of a 16/30 mesh frac sand were placed in a standard API filter press with only the screen in place (no paper); water was added, and the water drained to remove the free water; about 1 bbl equivalent of a mud sample was added to the API cell and 100 psi differential pressure was applied as in the standard API fluid loss test; thereafter, the fluid which seeped through the sand pack was caught until the sand pack was sealed, i.e., when only drops of fluid emerged from the sand pack. The volume of the fluid which seeped through the sand pack and the time to form the seal were measured. The data obtained are given in Table A.

TABLE A

| Example | 1 | 1 |
|---|---|---|
| SLA, ppb | 0 | 10 |
| Initial Rheology | | |
| Apparent Viscosity, cp | 32.5 | 36 |
| Yield Point, lb/100 sq. ft. | 19 | 16 |
| Properties After H.R. | | |
| Apparent Viscosity, cp | 42 | 51 |
| Yield Point, lb/100 sq. ft. | 22 | 22 |
| 10 Sec. G.S., lb/100 sq. ft. | 9 | 8 |
| Sand Pack Test | | |
| Shut-Off Time, sec | — | 3 |
| Shut-Off Volume, cc | CFL | 4 |

EXAMPLE 2

The Oat Hulls No. 1 was separated into fractions having particle size ranges from: 250–590 microns (30/60 mesh), designated Oat Hulls No. 2; 149–250 microns (60/100 mesh), designated Oat Hulls No. 3; 74–149 microns (100/200 mesh), designated Oat Hulls No. 4; and less than 74 microns (−200 mesh), designated Oat Hulls No. 5.

These and other samples of ground oat hulls as set forth in Table I were evaluated as in Example 1 at a concentration of 10 ppb in a clay base aqueous drilling fluid containing 23 ppb API bentonite, 1.85 ppb chrome-lignosulfonate, sodium hydroxide to provide a pH of about 11.5, barite to provide the drilling fluid with a density of 10.5 ppg, and fresh water. The data obtained are given in Table B.

EXAMPLE 3

The Ground Corn Cobs No. 1 sample was separated into fractions having particle size ranges from: 250–590 microns (30/60 mesh), designated Corn Cobs No. 2; 149–250 microns (60/100 mesh), designated Corn Cobs No. 3; 74–149 microns (100/200 mesh), designated Corn Cobs No. 4; and less than 74 microns (−200 mesh), designated Corn Cobs No. 5.

These samples were evaluated as in Example 2 at a concentration of 10 ppb in various blends with Oat Hulls No. 1 or Oat Hulls No. 2. The data obtained are given in Table B.

EXAMPLE 4

Various additional ground corn cob samples were evaluated with ground Oat Hulls No. 1 as in Example 3. The data obtained are also presented in Table B.

TABLE B

| | Initial API Rheology | | Properties After Hot Rolling | | | Shut-Off | |
|---|---|---|---|---|---|---|---|
| Seepage Loss Reducing Additive | Apparent Viscosity | Yield Point | Apparent Viscosity | Yield Point | 10 sec/10 min Gel Strength | Time sec | Vol cc |
| NONE | 30 | 6 | 32 | 10 | 3/3 | — | CFL |
| Oat Hulls No. 1 | 56 | 14 | 69 | 40 | 4/10 | 4 | 12 |
| Oat Hulls No. 2 | 40.5 | 9 | 53 | 24 | 5/12 | 9 | 32 |
| Oat Hulls No. 3 | 46 | 12 | 58.5 | 29 | 5/13 | 3 | 2.5 |
| Oat Hulls No. 4 | 64 | 28 | 71.5 | 37 | 10/30 | 56 | 73 |
| Oat Hulls No. 5 | 57.5 | 23 | 85 | 52 | 11/28 | — | CFL |
| 90% OH #1 + 10% C.C. #1 | 48 | 15 | 63 | 29 | 4/9 | 4.5 | 11 |
| 90% OH #1 + 10% C.C. #2 | 51 | 16 | 50 | 22 | 5/8 | 5 | 10.5 |
| 90% OH #1 + 10% C.C. #3 | 51 | 14 | 66.5 | 33 | 6/9 | 3 | 4 |
| 90% OH #1 + 10% C.C. #4 | 52.5 | 15 | 60.5 | 33 | 5/9 | 2 | 1 |
| 90% OH #1 + 10% C.C. #5 | 48 | 14 | 64 | 26 | 4/10 | 4 | 7 |
| 85% OH #1 + 15% C.C. #5 | 51.5 | 21 | 65 | 24 | 5/12 | 3 | 11 |
| 80% OH #1 + 20% C.C. #5 | 51.5 | 15 | 61 | 24 | 5/11 | 3 | 6 |
| 75% OH #1 + 25% C.C. #5 | 49.5 | 17 | 63.5 | 27 | 5/9 | 3 | 15 |
| 90% OH #2 + 10% C.C. #2 | 44.5 | 9 | 58 | 24 | 5/8 | 6 | 50 |
| 90% OH #1 + 10% C.C. #6 | 50 | 16 | 66 | 34 | 5/11 | 4 | 11 |
| 90% OH #1 + 10% C.C. #7 | 51 | 18 | 58 | 24 | 5/10 | 3 | 9 |
| 90% OH #1 + 10% C.C. #8 | 51.5 | 13 | 67.5 | 35 | 5/11 | 4 | 12 |

EXAMPLE 5

Various blends of the Oat Hull samples No. 2–No. 5 of Table I were prepared and evaluated at a concentration of 7.5 ppb in a low solids polymer drilling fluid containing 3 ppb xanthomonas campestris biopolymer (XCD) and 4 ppb pre-gelatinized potato starch in fresh water. The ability of the fluids to seal off a porous sand was evaluated in the following manner: 300 grams of a 50/70 mesh frac sand were placed in a standard API filter press with only the screen in place (no paper), water was added, and nitrogen pressure was applied to drain the water leaving a water-wet sand pack; about 1 bbl equivalent of a mud sample was added to the API cell and 100 psi differential pressure was applied as in the standard API fluid loss test; thereafter the volume of fluid which seeped through the sand pack until the sand pack was sealed, i.e., when only drops of fluid emerged from the sand pack, was measured as the spurt loss. The volume of fluid after 30 minutes of applied pressure was also measured. The data obtained are given in Table C.

TABLE C

| Blend Number | Sample Blend, % Oat Hulls No. 2 | No. 3 | No. 4 | No. 5 | Spurt Loss Seconds | 30 Minutes Fluid Loss, cc | cc |
| --- | --- | --- | --- | --- | --- | --- | --- |
| 5-1 | 0 | 0 | 0 | 100 | 12 | 27 | 51 |
| 5-2 | 0 | 0 | 100 | 0 | 17 | 36 | 64 |
| 5-3 | 0 | 0 | 67 | 33 | 6 | 36 | 74 |
| 5-4 | 0 | 30 | 35 | 35 | 21 | 42 | 71 |
| 5-5 | 0 | 25 | 50 | 25 | 9 | 32 | 48 |
| 5-6 | 0 | 25 | 25 | 50 | 5 | 27 | 41 |
| 5-7 | 0 | 40 | 30 | 30 | 10 | 35 | 53 |
| 5-8 | 0 | 45 | 5 | 50 | 10 | 49 | 67 |
| 5-9 | 40 | 0 | 30 | 30 | 15 | 38 | 57 |
| 5-10 | 20 | 20 | 30 | 30 | 10 | 28 | 45 |
| 5-11 | 0 | 45 | 25 | 30 | 13 | 57 | 78 |
| 5-12 | 0 | 50 | 0 | 50 | 10 | 75 | 108 |
| 5-13 | 0 | 50 | 25 | 25 | 31 | 112 | CFL |
| 5-14 | 0 | 20 | 80 | 0 | CFL | | |
| 5-15 | 0 | 35 | 65 | 0 | CFL | | |
| 5-16 | 0 | 50 | 50 | 0 | CFL | | |

EXAMPLE 6

Oat Hulls No. 1 and various mixtures of Ground Corn Cobs No. 1 were evaluated as seepage loss reducing additives at a concentration of 15 ppb as in Example 2. The data obtained are given in Table D.

TABLE D

| | 0 | 15 | 15 | 15 | 15 | 15 | 15 |
| --- | --- | --- | --- | --- | --- | --- | --- |
| Seepage Loss, Reducing Additive. ppb | | | | | | | |
| Out Hulls No. 1, % | None | 100 | 95 | 90 | 85 | 80 | 75 |
| Corn Cobs No. 1, % | None | 0 | 5 | 10 | 15 | 20 | 25 |
| Initial Rheology | | | | | | | |
| Apparent Viscosity, cp | 30 | 74 | 60.5 | 68.5 | 63.5 | 53.5 | 61 |
| Yield Point, lb/100 sq. ft. | 8 | 38 | 23 | 27 | 33 | 21 | 20 |
| Properties After H.R. | | | | | | | |
| Apparent Viscosity, cp | 31 | 97 | 86 | 79 | 83 | 78.5 | 75 |
| Yield Point, lb/100 sq. ft. | 8 | 84 | 44 | 34 | 44 | 33 | 26 |
| 10 sec/10 min G.S., lb/100 sq. ft. | 2/3 | 8/23 | 6/10 | 4/10 | 6/11 | 4/9 | 4/6 |
| Sand Pack Test | | | | | | | |
| Shut-Off Time, sec | — | 1 | 2 | 3 | 2 | 2 | 1.5 |
| Shut-Off Volume, cc | CFL | 1 | 2.5 | 3.5 | 1.5 | 1.5 | 1.0 |

EXAMPLE 7

Oat Hulls No. 1 and various mixtures of a hydrophobic, organophilic, water-wettable cotton (HOWWC), the product disclosed and claimed in Cowan et al. U.S. Pat. No. 4,404,107 were evaluated as seepage loss reducing additives at a concentration of 10 ppb in an aqueous drilling fluid comprising 27.5 ppb API grade pre-hydrated Wyoming bentonite in fresh water. The data obtained are given in Table E.

TABLE E

| | 0 | 10 | 10 | 10 | 10 | 10 | 10 |
| --- | --- | --- | --- | --- | --- | --- | --- |
| Seepage Loss Reducing Additive, ppb | | | | | | | |
| Oat Hulls No. 1, % | 0 | 100 | 90 | 80 | 70 | 50 | 0 |
| HOWWC, % | 0 | 0 | 10 | 20 | 30 | 50 | 100 |
| Initial Rheology | | | | | | | |
| Apparent Viscosity, cp | 41 | 46 | 41.5 | 38.5 | 38.5 | 33.5 | 32.5 |
| Yield Point, lb/100 sq. ft. | 32 | 34 | 23 | 23 | 19 | 19 | 19 |
| Sand Pack Test | | | | | | | |
| Shut-Off Time, sec | — | 15 | 17 | 12 | 11 | 12 | 75 |
| Shut-Off Volume, cc | CFL | 58 | 44 | 34 | 33 | 35 | 165 |

EXAMPLE 8

Oat Hulls No. 1 and various combinations of Ground Corn Cobs No. 1, the hydrophobic organophilic water wettable cotton of Example 7, and ground cotton burrs were evaluated as seepage loss reducing additives in an aqueous drilling fluid comprising 27.5 ppb API pre-hydrated Wyoming bentonite in fresh water, and several of these materials were evaluated in the same fluid containing 10 ppb Escaid 110 mineral oil. The data obtained are given in Table F.

Although the invention has been described by reference to preferred ranges and specific examples of embodiments thereof have been set forth, it is not meant to limit the invention to the particular forms set forth, and it is our intention to cover hereby all novel adaptations, modifications and arrangements thereof which come within the practice of those skilled in the art, and which come within the purview of the following claims.

TABLE F

| Seepage Loss Reducing Additive | | | Escaid 110 Mineral Oil, ppb | Initial API Rheology | | Sand Pack Test Shut-Off | |
| --- | --- | --- | --- | --- | --- | --- | --- |
| Oat Hulls No. 1, % | Other Additive*, % | ppb | | AV | YP | Time sec. | Vol. cc |
| 100 | None | 10 | 0 | 46 | 34 | 15 | 58 |
| 100 | None | 10 | 10 | 40.5 | 31 | 12 | 48 |
| 90 | C.C. No. 1, 10 | 10 | 0 | 41 | 38 | 15 | 56 |
| 80 | HOWWC, 20 | 10 | 0 | 38.5 | 19 | 12 | 34 |
| 80 | HOWWC, 20 | 10 | 10 | 41 | 24 | 9 | 29 |
| 80 | GCB, 20 | 10 | 0 | 40.5 | 25 | 11 | 31 |

*HOWWC = Hydrophobic Organophilic Water Wettable Cotton (See Ex. 8); GCB = Ground Cotton Burrs

What is claimed is:

1. An additive for decreasing the seepage loss of fluid from a well working fluid in contact with a fluid permeable formation which comprises ground oat hulls wherein at least about 95% of the particles are less than about 590 microns, the particle size determined by dry sieve analysis after admixing the ground oat hulls with 3% by weight of fumed silica.

2. The additive of claim 1 wherein at least about 75% of the particles are less than about 250 microns.

3. The additive of claim 2 wherein at least about 10% of the particles are less than about 74 microns.

4. An additive for decreasing the seepage loss of fluid from a well working fluid in contact with a fluid permeable formation which comprises a mixture of from about 1% to about 99% by weight ground oat hulls and from about 1% to about 99% by weight of a particulate material selected from the group consisting of ground corn cobs, hydrophobic organophilic water wettable cotton, ground citrus pulp, ground cotton burrs, and mixtures thereof, wherein the additive has a particle size, determined by dry sieve analysis after admixing the additive with 3% by weight of fumed silica, such that at least about 95% of the particles are less than about 590 microns.

5. The additive of claim 4 wherein the ground oat hulls has a particle size distribution such that at least about 75% of the particles are less than about 250 microns.

6. The additive of claim 5 which has a particle size distribution such that at least about 10% of the particles are less than about 74 microns.

7. The additive of claim 4, 5, or 6, which comprises a mixture of from about 75% to about 95% by weight ground oat hulls and from about 5% to about 25% by weight particulate material.

8. A drilling fluid comprising as a major constituent an oily petroleum liquid and sufficient of the seepage loss additive of claim 1, 2, 3, 4, 5, or 6 to decrease the seepage loss of said drilling fluid.

9. A drilling fluid comprising as a major constituent an aqueous liquid and sufficient of the seepage loss additive of claim 1, 2, 3, 4, 5, or 6 to decrease the seepage loss of said drilling fluid.

10. A process of reducing the seepage of a well working fluid into a permeable formation contacted by the fluid which comprises adding to the well working fluid a quantity of the seepage loss additive of claim 1, 2, 3, 4, 5, or 6 sufficient to effect such reduction.

* * * * *